METHOD AND APPARATUS FOR PRODUCING METAL-FOIL CLAD SYNTHETIC RESIN LAMINATES

Filed May 20, 1963 3 Sheets-Sheet 1

NICHOLAS S. JANETOS,
PAUL D. YAKUBOFF &
ALFRED WINSOR BROWN
INVENTORS

BY Staelin & Overman

ATTORNEYS

OPEN PRESS POSITION

CLOSED PRESS POSITION

GASKET "SQUASH" POSITION

NICHOLAS S. JANETOS,
PAUL D. YAKUBOFF &
ALFRED WINSOR BROWN
INVENTORS

BY Stachi + Oberman
ATTORNEYS

NICHOLAS S. JANETOS,
PAUL D. YAKUBOFF &
ALFRED WINSOR BROWN
INVENTORS

BY Stachi & Ausman
ATTORNEYS 3,361,608

METHOD AND APPARATUS FOR PRODUCING METAL-FOIL CLAD SYNTHETIC RESIN LAMINATES

Nicholas S. Janetos, Providence, and Paul D. Yakuboff and Alfred Winsor Brown, Woonsocket, R.I., assignors to Owens-Corning Fiberglas Corporation, a corporation of Delaware Filed May 20, 1963, Ser. No. 281,511
11 Claims. (Cl. 156—163)

This invention relates to metal-resin laminates, apparatus and method of production. More particularly, this invention relates to novel metal foil faced synthetic resin containing sheets useful among other things for circuit boards; and to apparatus and method of production.

*The problem*

Glass flake reinforced epoxy resins provide an ideal base material for printed circuit boards. They are characterized by low dielectric constants, low power and loss factors, durability and long life. However, their production presents a number of difficult problems which arise because of several factors including the following:

(1) The resin tends to boil rather readily because of the substantial exotherm of reaction developed during curing; this produces "snow" areas (non-coherent structure or porous structure) causing rejects.

(2) The resin shrinks during curing.

(3) A direct bond between copper sheet cladding material which is ideal for the production of printed circuit boards and the resin has been difficult to obtain. Thus, the use of copper foil treated in a particular manner with a particular adhesive applied to one surface has been necessary to provide a satisfactory bond.

(4) The finished resin boards characteristically warp on cooling after curing.

*The step forward*

Accordingly, a substantial advance in the art would be provided by:

(1) Novel printed circuit boards or foil-clad laminates;

(2) Apparatus for producing metal-clad laminates having improved surface finish smoothness and improved flatness; and (3) A method of producing improved metal-clad laminates in a one-step operation.

*Objects*

Accordingly, it is an important object of the present invention to provide novel printed circuit boards of glass flake-filled epoxy resins and clad with electrically conductive metals.

A further object is to provide apparatus for producing metal-clad resin laminates.

A further object of the invention is to provide a novel one-step method for producing metal-clad epoxy resin laminates.

A still further object is to provide novel printed circuit boards of glass flake-filled epoxy resin, characterized by improved surface finish and flatness.

A further object is to provide a novel method for producing metal-clad synthetic resin laminates in a single step wherein the resin is cured and the metal cladding is simultaneously flattened or smoothed.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Perspective view*

Briefly, the present invention embodies the following features:

(1) Novel metal foil-resin laminates particularly useful for printed circuit boards and characterized by improved smoothness of surface finish of both the resin and the metal foil cladding and improved flatness in the final product;

(2) Novel apparatus for producing the products of 1; and (3) A novel method for producing metal foil synthetic resin laminates.

In view of the foregoing, a comprehensive description now follows:

*The novel circuit board structure*

Figure 1:
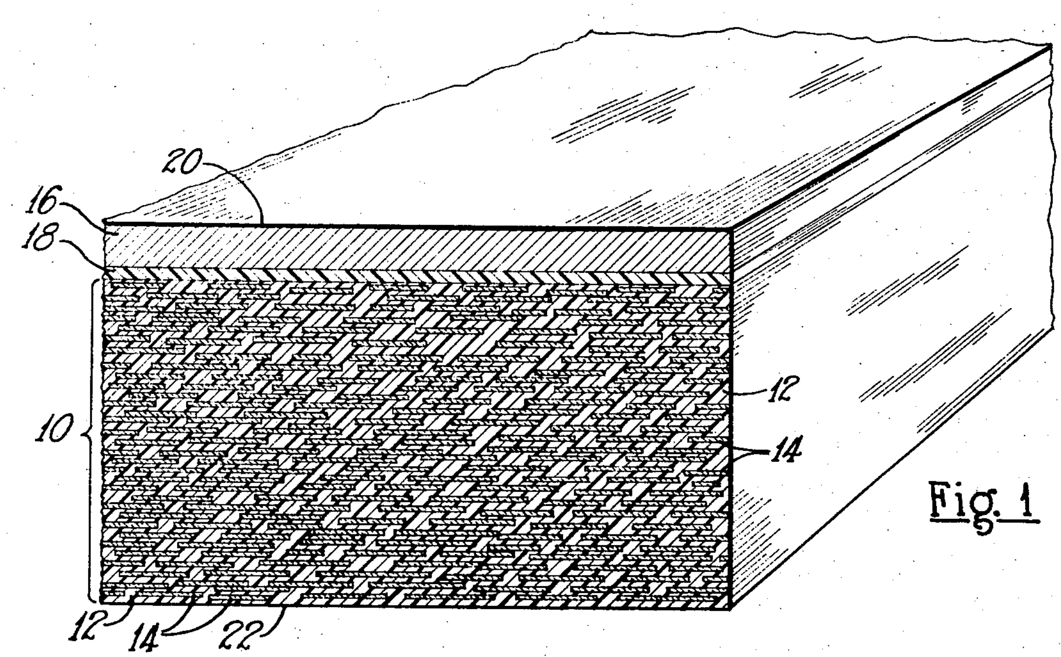
FIGURE 1 is a greatly enlarged fragmentary section view of a metal foil-clad laminate made according to the invention.

By reference to FIGURE 1, it will be noted that the base or carrier portion of a panel of invention is designated by the reference numeral 10. This comprises a resin matrix 12 having glass flakes 14 uniformly interspersed therethrough. To the top of the base 10, there is secured a metal foil 16. Between the metal foil 16 and the base 10, there is interposed a very thin layer of adhesive or bonding agent 18.

It will be noted that the top edge 20 and the bottom edge 22 are straight and parallel. This means that the top surface of the metal sheet 16 is of substantially mirror smooth configuration, meaning substantially flat in planar dimensions.

From the foregoing, it will be evident that the novel board of the present invention has the following characteristics:

(a) A bond or bonding agent forming a perfect and permanent joint between the epoxy base and the metal foil;

(b) The foil is flat and of mirror-like smoothness;

(c) The finished boards are flat and free from any warpage.

It should be pointed out at this time that due to the fact that milled glass flakes are employed, improved smoothness of surface finish is imparted to the products of the present invention. Milled flake is used to characterize flakes that have been reduced in surface area as by hammermilling or the like.

The apparatus

As an introduction to the description of the apparatus, it must be reiterated at this point that epoxy resins exhibit two characteristics during curing which must be controlled to provide satisfactory and salable products. These are as follows:

(a) The resin system often has a tendency to boil during the exotherm of curing and this must be controlled by sufficient mold pressure; and (b) The resin often tends to shrink during curing and this must be compensated for by press platen movement during the cure cycle.

The above factors are controlled in accordance with the apparatus of the present invention by providing a compressive restraining means around the resin while it is between the press platens so that appropriate pressure and shrinkage compression motion can be effected.

Apparatus for single clad boards

Figure 2:
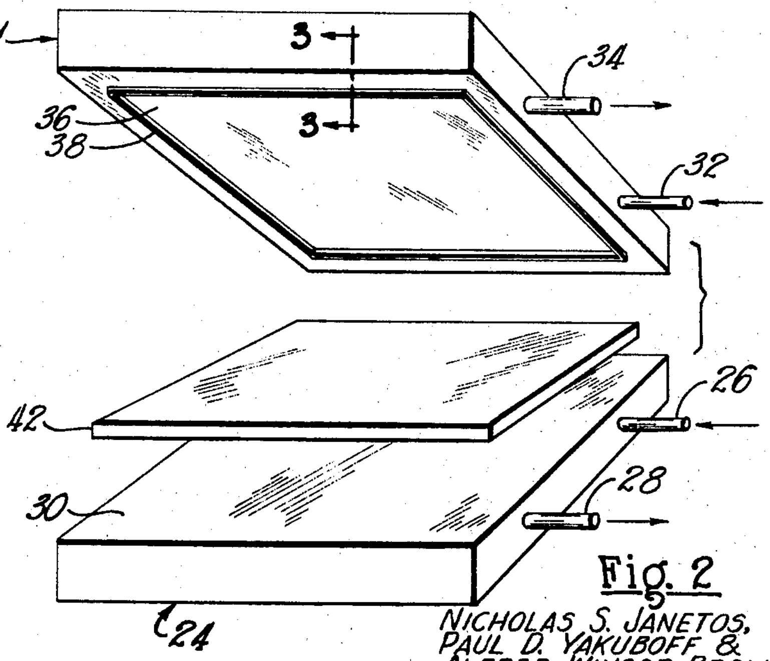
FIGURE 2 is an exaggerated perspective view of press apparatus useful for producing single clad laminates.

By reference now to FIGURE 2 of the drawings, one apparatus for restraining the resin against flow is illustrated. Let it be noted at this point that FIGURE 2 represents an exaggerated, open perspective view of the press platens. Note that the bottom press platen, designated by the reference numeral 24, is a flat steel block with heating channels therein. An inlet 26 admits heated fluid and an outlet 28 conducts the spent fluid back to a heater for recirculation. The top surface 30 is of planar configuration, meaning ground to a substantially flat condition.

The upper press platen is designated by the reference numeral 31 and is heated similarly to the bottom platen 24. For this purpose, an inlet conduit 32 and an outlet conduit 34 are connected to suitable internal passages for the circulation of an appropriate heated liquid. The platen surface is designated 36, and this is flat as is the functional surface 30 of the lower platen 24.

However, restraining means for the resin is provided in the functional surface 36. This comprises a heat-resistant and resilient gasket material such as Teflon (trademark for tetrafluoroethylene resins; characterized by heat-resistance; toughness; flexibility; low coefficient of friction; resistance to adhesion; and nonflammability). This is designated by the reference numeral 38 in FIGURE 2.

Note that the gasket 38 is laid out in a rectangular or generally square arrangement to encompass the perimeter of a panel to be made. It might be mentioned for purposes of exemplification that panel production in accordance with the present invention can range from small sizes, e.g., six inches by six inches to as high as 48" x 48", or other, depending on press bed limitations.

Figure 3:
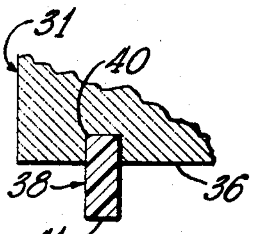
FIGURE 3 is a fragmentary section view taken along line 3—3 of FIGURE 2.

The manner in which the gasket 38 is set into the platen functional surface 36 is illustrated by reference to FIGURE 3. Thus, a slot 40 is provided as by suitable steel milling procedures. The gasket 38 is suitably of generally rectangular section with the upper half pressed into the slot 40 and retained by friction fit. Thus, the lower half is exposed, and this will be referred to hereinafter as a heat-resistant, pliable restraining projection 41. The lower corners are radiused in workmanlike manner. Gaskets of circular cross section are also within the scope of invention; the lower portion similarly exposed.

Another important feature of the apparatus relating to the production of single clad circuit boards or laminates comprises an aluminum caul sheet 42, also shown in FIGURE 2.

This is placed in direct thermal contact with the functional surface 30 of the platen 24 for heat transfer and handling the wet lay-up. On this caul sheet 42, as will be brought out later, is positioned a laminate with the foil thereof in direct contact with the caul sheet.

As will be brought out later, when the cure cycle starts, the caul should be at about room temperature.

Operation of the apparatus

The manner in which the heat-resistant basket functions in combination with the lower caul sheet will now be described by referring to FIGURES 4, 5 and 6 of the drawings.

Figure 4:
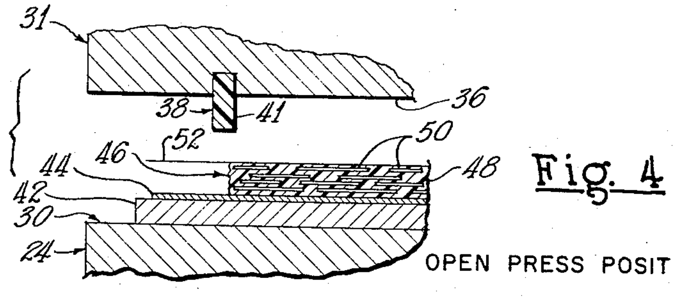
FIGURE 4 is a fragmentary section view showing a laminate positioned in a molding press with the press open.

By reference to FIGURE 4, note that the aluminum caul sheet 42, of approximately 0.090" thickness, is laid directly on the functional surface 30 of the bottom press platen 24. The next element is the metal foil 44. Next a layer of resin, such as a flame-retardant epoxy formulation containing glass flake. The composite is designated by the reference numeral 46. Looking more closely, note that the resin matrix is designated 48 and the flakes 50.

Over the resin glass matrix 46 is placed a mold release film 52. Above the film 52, in the open press position shown in FIGURE 4, can be observed the platen functional surface 36 of the top press platen 31. Also, the restraining projection 41 of the gasket 38 can be observed.

Begin cure cycle

Figure 5:
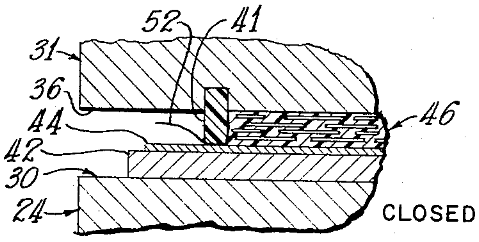
FIGURE 5 shows the press of FIGURE 4 closed and the configuration of parts at the beginning of the cure cycle.
Figure 6:
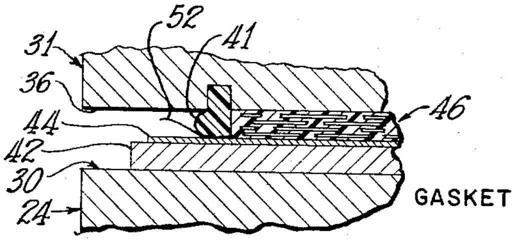
FIGURE 6 shows the configuration of parts of FIGURES 4 and 5 at the end of the cure cycle.

Refer now to FIGURES 5 and 6 of the drawings which show the configuration and function of the parts when the press is closed and as cure is effected.

In FIGURE 5, the platens have moved together to move the restraining project 41 against the mold release film 52 and carry it down into sealing contact with the metal foil 44. At the same time, the press functional surface 36 has pressed the resin-glass admix against the metal foil 44, and in turn against the aluminum caul sheet 42, and this in turn against the functional surface 30 of the bottom press platen. However, the flowable resin of the resin glass admix 46 is restrained by the projection 41.

This represents the status as the curing cycle begins.

An important note at this point is necessary. Thus, while the projection 41 restrains the flowable resin of the admix 46, it is also restrains the metal foil 44 against free expansion during the heating that is necesary to effect cure; and it does not suffice to prevent wrinkles that the metal foil 44 has been brought to temperature as by a preheat before the press platens are brought together. The subsequent positive thermal contact between foil and platen and the resin exotherm and resin shrinkage invariably result in wrinkling of the metal foil because of the restraint by the projection 41; unless the bottom caul 42 is used.

It is at this point that the "ironing out" feature of the invention comes into play. Thus, the aluminum caul sheet 42 has been purposely selected because of its coefficient of expansion that is greater than the coefficient of expansion of the metal foil 44.

During the pressing operation, the resin heats up quite violently by the exotherm of polymerization. This transmits heat directly to the copper foil causing it to expand quite rapidly with resultant wrinkles, unless the foil is ironed. The fact, however, that the foil is in thermal contact with the caul plate also causes heat transmission directly to the caul plate. The aluminum of the caul plate expands at a greater rate than the copper, and thus, though the caul plate has been pre-heated by contact with the press platen, it nevertheless expands further to produce the "ironing" from the higher heat of exotherm.

From the foregoing, it will be understood the press platens act as a heat sink when the exotherm is taking place. This ultimately keeps the resin polymerization reaction under control.

It was mentioned above that even with a pre-heat treatment prior to closing the press platens, resin shrinkage prevented the production of a non-wrinkled surface. In this regard, it should be noted that pre-heat treatment is substantially infeasible for any time duration, because it causes polymerization of the resin; and this before pressure is applied results in a rough, non-acceptable product.

Therefore, the manner in which the aluminum caul sheet irons out the metal foil during the exotherm of curing provides an unexpected result of wrinkle-free and improved smoothness of surface configuration to the finished product. The exotherm of cure is used to advantage for an unexpected result, turning a wrinkling force into a tension or ironing force.

The invention might be stated otherwise as follows: curing a shrinkable and heat-polymerizable resin in contact with a thermally expansible metal foil by simultaneously doing the following:

(1) Restraining, curing and compressing the resin while it shrinks; and (2) Ironing or tensioning by the heat of exotherm the metal foil to thus compensate for its thermal expansion and smooth the foil while expanding to a wrinkle-free condition.

The invention may also be stated as the bonding in smooth condition of a thermally expansible metal foil to a heat-polymerizable and polymerization-contractable synthetic resin.

The actual effect appears to be the tensioning of the metal foil and retaining it in "taut" condition to produce a wrinkle-free foil as the lamination begins and retain it in this condition by means of the exotherm during the time period when the lamination and bond with the heat-shrinkable resin is effected.

At this point, it should be stated that while aluminum is an ideal material for use as a caul sheet, it is preferred that it have the following characteristics:

(1) Appropriate thickness. It has been found that a thickness of about .060–.250 inch provides a good range within which to effect the invention.

(2) It is preferred that the caul sheet have a hardened surface to resist abrasion to scraping as is necessary for periodic cleaning. There are several methods of hardening the surface of an aluminum sheet presuming of course that an appropriate alloy is utilized in its manufacture. These include physical hardening as by shot peening; and chemical hardening as by various types of etches. The particular method of effecting this hardening is not germane to the invention and is well-known to those skilled in the art. It will suffice for the present to point out that a hardened surface sheet is preferred for most economical and trouble-free production.

While aluminum has been described above, and that in a generally specified thickness, it is to be considered that other combinations are evident within the logical extension of invention. The important point is that the caul sheet have a coefficient of expansion greater than and, for example, may be on the order of about two times greater than the metal foil being laminated to the resin-glass admix. Thus, where a foil of a very low coefficient of expansion might be utilized, it may be possible to use as caul plates ordinary iron sheets, stainless steel, or others. Accordingly, the broad concept to be encompassed by this disclosure and by the claims following is that of a caul plate having an appreciably greater coefficient of expansion than the laminating foil.

*Final cure cycle*

By reference to FIGURE 6, it will be noted that as the resin of the resin-glass admix 46 has shrunk, the restraining projection 41 has expanded or bellied out because of its pliability and thus positively restrained the resin against flow, Thus the projection 41 has continued to seal the mold release film 52 against the metal foil 44.

It will be noted that the gasket portion 41 has bulged to the left. The reason is that the compressed resin prevents movement in the other direction. In actual practice, it has been found that a sufficiently smooth and finished edge is produced by the gasket 38 so that the panels can be transferred or shipped to a circuit board processor substantially in "as is" condition.

*Double clad apparatus*

The foregoing description has related to the production of single clad boards. This means a foil bonded to one surface only. However, the extended scope of invention also includes the production of double clad boards, meaning a foil bonded to each of the major surfaces of the boards. Apparatus suitable for this purpose is disclosed in FIGURE 7.

In this embodiment of the invention, a second caul plate is used, and the restraining gasket is carried by one of the caul sheets and the top mold surface is therefore smooth. The purpose of the upper caul sheet, of course, is to iron out the upper foil. In this view, the upper caul sheet has been used to carry the gasket.

Accordingly, the lower platen 24 and caul plate 42 are as previously described. However, the working surface of the upper press platen is devoid of the gasket shown in FIGURE 2 and is therefore flat. Accordingly, to distinguish from FIGURE 2, this surface is designated 36' in FIGURE 7. Also 31' designates the different press platen.

In this embodiment, the upper caul plate is designated 54. The manner in which the gasket 38 is set into the caul plate 54 is the same as in FIGURE 3.

The manner in which this embodiment of the invention functions is the same as shown in FIGURES 4–6; it, of course, being understood that the double clad laminate will have a metal foil at the top instead of the release film 52 shown in these figures.

Of course, it is to be understood that the upper caul sheet plate will expand in a manner hereinbefore described to iron out the upper foil. Thus, this embodiment is adapted to the production of double clad laminates wherein the foils are both smooth and wrinkle free.

*The process of invention*

Generally the process of invention may be said to encompass the ironing or tensioning described above relative to the apparatus. In addition, however, the process encompasses some subtle innovations as regards estabishing a bond between the metal foil and the resin-glass admix. These will become apparent as follows.

Figure 7:
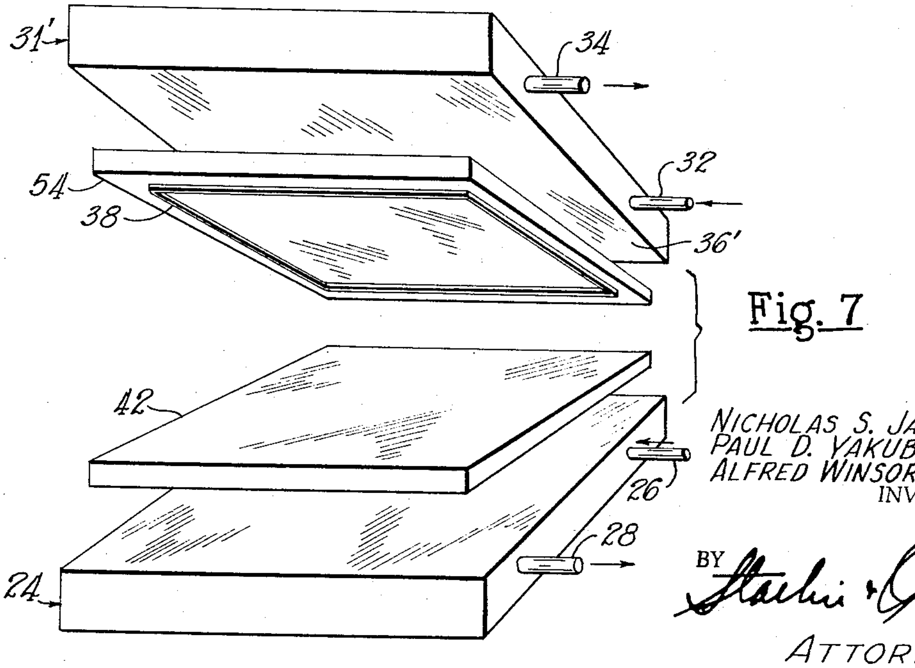
FIGURE 7 is an exaggerated view similar to FIGURE 2, but showing apparatus useful for producing double clad laminates.

By reference to FIGURE 7 of the drawings, it will be observed that the process of invention is of two-fold aspect as follows:

(1) A unique bond between a copper foil cladding material and the resin-glass flake admix; and (2) The "ironing" action. This must be developed to compensate for the restraint imposed on the foil by the gasket material which restrains the mobile resin against flow that would otherwise result because of the force imposed by the press platens. Thus, two opposite movement characteristics are compensated for during the bonding operation:

(a) shrinkage of the resin; and (b) expansion of the foil.

It is at this point that the heat of the polymerization exotherm is used to unexpected advantage to expand the caul plate and produce the ironing action.

Figure 8:
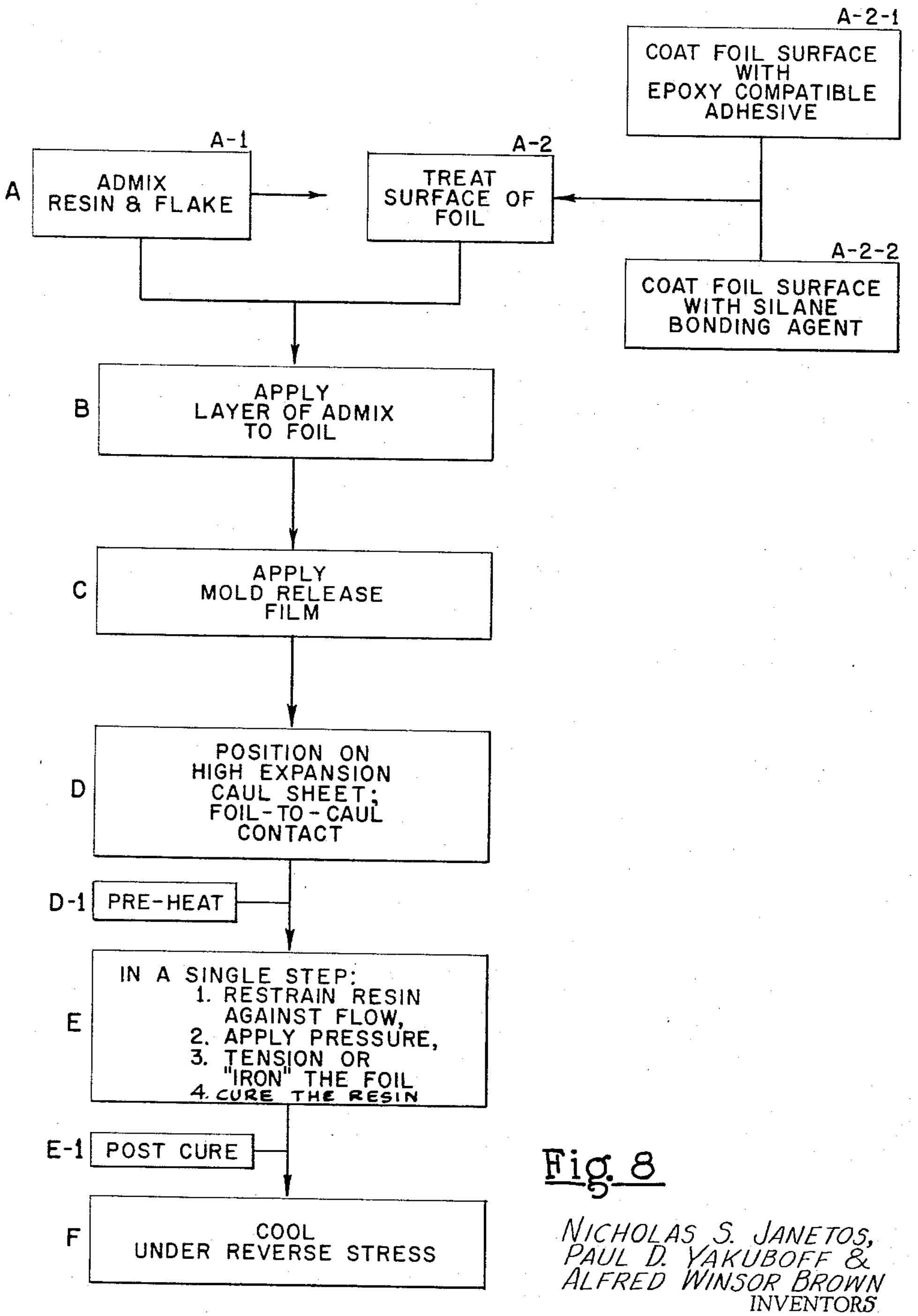
FIGURE 8 is a schematic illustration of the method of invention.

By reference to FIGURE 8, it will be noted that the various method steps within the total scope of invention to encompass the foregoing dual aspects include the following:

Step A: Providing resin flake admix and treated foil.

A–1: Admix resin syrup and glass flake. This produces proper wet out of the flakes by the resin and as will be described hereinafter involves vacuum techniques under certain conditions of glass-resin ratios. Also, milled flake is preferred for greatest smoothness of the laminate.

A–2: This step involves the treatment of the foil to render it bondable to the resin of the flake-resin admix. This step has two options as follows:

A–2–1; Involves coating one surface of the foil with an epoxy compatible adhesive; or A–2–2: Coating one surface of the foil with a silane or silicone bonding agent.

Step B: Apply a layer of the admix to the treated foil surface.

Step C: Apply mold release film to the exposed surface of the admix layer.

Step D: Position the laminate assembly on the high expansion surface in foil-to-caul surface contact;

Step D–1: Pre-heat the caul-foil-laminate assembly.

Step E: In a single step or simultaneously, do the following:

(1) Restrain the resin against compression flow.

(2) Apply pressure to compensate for shrinkage, control exotherm boil and force solution of any entrained gas.

(3) "Iron out" or tension the foil.

(4) Cure the resin.

Step E–1: Post cure.

Step F: Cool the cured unit under reverse stress.

In the light of the foregoing perspective view of the method(s) involved in the present invention, a comprehensive description of each stage and the coordination of the stages will now be provided.

Step A. Providing resin-flake admix and treated foil.

By reference to FIGURE 8 of the drawings, it will be noted that the Step A broadly encompasses the preparation of the two basic components that go into the production of the foil-resin laminate as follows:

(1) The resin-flake admix; and (2) A foil having a surface treated to render it adhesive or bondable to the resin.

Step A thus comprises the following side-by-side operational procedures:

Step A–1. Comprises admixing the resin and a selected proportion of glass flake as filler. It is rather important to note that in order to provide a proper wetting of the flakes by the resin during mixing of the two materials, certain proportions of flake require vacuum techniques. It has been found that when approximately 25% by weight of glass or less is utilized, proper wet-out of the flakes can be provided by a simple mixing operation. However, where relatively higher percentages of flakes are utilized, vacuum mixing is desirable and, in some instances, necessary in order to provide proper flake wet-out. Thus, where 45% flake have been utilized, vacuum mixing has been found to be necessary. Vacuum lowers resin viscosity to facilitate wet-out.

Step A–2. Broadly, this step relates to the treatment of one surface of the foil to render it bondable to the resin. This has been found to be a rather difficult operation and, in solving the problem of a proper bond, two alternate procedures have been developed as follows:

A–2–1. Comprises coating one of the foil surfaces with an epoxy-compatible adhesive. One suitable adhesive has a formulation as follows:

| Ingredients | Percent by Weight | |
|---|---|---|
| | Preferred | Broad |
| Butvar B-90 (polyvinyl butyral resin powder containing about 19% polyvinyl alcohol) | 15 | 0.1–20 |
| Phenolic Plastic BLS-3021 (bakelite phenolic formaldehyde resin) | 2 | 1–5 |
| Anhydrous Isopropyl Alcohol | 83 | 60–90 |

This formulation when applied to a surface of a copper foil of approximately 2 mils thickness has high peel strength and withstands molten solder without loosening.

The preparation is made by admixing the phenolic formaldehyde resin in alcohol heated to 100° F. with agitation to dissolve the resin. Then the polyvinyl butyral resin is added with agitation until a homogeneous solution results. The adhesive is applied to the copper foil with a reverse roll coater while heated to 180° F.

*Alternate procedure*

An alternate manner of conditioning rather than adhesively coating the foil comprises application of a bonding agent according to the following optional step or treatment:

Step A–2–2. This involves the application of a silane or siloxane bonding agent to the oxidized surface of a copper sheet. Such material is applied in volatile solvent and the solvent then removed as by mild heating.

After the foregoing side-by-side operational procedure making up Step A in toto, the next step of the process follows:

Step B. A layer of the admix is applied to the treated foil surface. This is suitably done by a doctor roll operation or the like.

Step C. Thereafter, a mold release film such as siloxane coated aluminum foil-backed kraft paper is applied to the exposed surface of the admix layer. Tedlar (trademark for Du Pont pvf film) could also be used per se or as a Tedlar-paper laminate. No covering is applied to the copper foil as this is placed in direct thermal contact with the aluminum caul sheet, as brought out in the description of the next step.

Step D. Position the laminate assembly, including release film, resin layer and foil, on a high expansion caul sheet in foil-to-caul contact. The importance of the caul sheet to the tensioning during curing has been brought out above.

Step D–1. It has been found that optimum operation is brought about when the entire assembly is pre-heated prior to bringing the press platens together. This allows both the foil and the caul plate to expand initially. However, the pre-heating period is limited to prevent prematurely starting the resin polymerization before the control pressure is applied.

Step E. In a single step or simultaneously, do the following:

(1) Restrain the resin against flow of the compression produced by the press platens within an enclosed cavity as provided by opposed platen surfaces and an encircling pliable heat-resistant gasket material;

(2) Apply pressure to compensate for shrinkage of the resin during curing and control exothermic boil and enhance the solution of occluded gases to prevent sheet defects;

(3) Cure the resin; and (4) Tensioning or "ironing" the foil to prevent expansion wrinkling by utilizing the higher heat from the exotherm to expand the caul plate.

Step E–1. Post cure. In one typical operation, this comprises an oven soak of four hours at 300° F. followed by four hours at 350° F. to finalize the resin polymerization. These figures will vary according to the particular resin formulation.

Step F. This involves cooling the cured unit under reverse stress to prevent warpage. Inasmuch as the copper foil has a higher thermal expansion coefficient, it correspondingly has a greater shrinkage factor on cooling than the resin which has previously shrunk during the curing operation. This normally tends to bow or warp the finished laminate.

To counteract this warpage, the cured laminate is placed under a reverse stress, that is, to bow the finished board in a direction tensioning the foil. This position is maintained until the unit is cooled. Thereafter, when the stress is relieved, the unit achieves a flat condition and remains so.

Relative to double clad laminates, no reverse stress cooling is necessary. The opposed foil claddings compensate.

EXTENDED SCOPE OF INVENTION

*Glass flakes*

The foregoing disclosure has alluded to glass flake in general. In the preferred embodiment of the invention, E-glass is preferred. However, the broad scope of invention will include other glasses of this general type. Glasses of the lower dielectric constant typified by a dielectric constant of 6 would generally be preferred. Glasses having dielectric constants as low as 4 of course are highly desirable and can even further enhance the ultimate utility of the product of the present invention.

The broad scope of invention will include raw glass flakes, hammermilled, fitzmilled or ball-milled glass flakes to reduce the surface area thereof. In general, it has been found that the milled flakes produce a laminate of improved surface smoothness.

In circuit boards of the prior art, a visual defect only has been observed during the cutting, drilling or punching of the boards. It has been found that milled flakes cut down on this visual defect because the separations produced by the cutting operations between the flake and the resin do not extend as far into the body as with non-milled flakes having greater surface area.

Milled flakes appear to reduce the dielectric strength to some extent, because of their smaller area. Thus, the smaller area presents a smaller voltage barrier than the non-milled flakes. However, the slight compromise in dielectric strength is so minute as to be unmeasurable; therefore, the physical appearance improvement outweighs the slight lowering of the dielectric strength; and accordingly, it is within the scope of invention to provide an improved appearance in the product.

The amount of glass flake by weight used in accordance with the present invention is not to be considered limiting, except as regards the end use requirements for circuit boards and the like. In general, it may be stated that the higher glass contents produce higher dielectric strengths and lower power loss as regards the production of circuit boards. In general, glass contents for these applications tend to be in the range of about 25% to about 75% by weight.

However, as regards other than circuit board applications, the percentage of glass can extend over a broader range and still provide sufficient structural rigidity for a number of applications.

*Bonding agent thickness*

In applying the silane bonding agent, it has been found that a layer, approximately 0.1 mil in thickness provides a very excellent metal to resin bond. However, substantial leeway can be tolerated in the amount of the bonding agent employed.

*Resins*

Epoxy resins are generally to be encompassed within the scope of invention and no particular formulation is considered to be limiting. However, it may be stated that flame retardants containing bromine compounds or the like can be employed as additives to meet military specifications relative to circuit boards and Underwriters Laboratories' specifications as well. Resins analogous to epoxies, however, are to be encompassed within the extended scope at least as regards the apparatus and process. Exemplary are modified polyesters, Butons (trademark) (hydrocarbon-styrene-butadiene system), modified acrylics; and thermoplastic resin systems.

*Metal foils*

While copper has been particularly alluded to above, the broad scope of invention would include substantially any metal foil having a thermal coefficient of expansion as contrasted to a shrinkable nature of a resin. Thus, lead, titanium, nickel and others are to be encompassed within the scope of invention.

As regards copper foils, the surface to be bonded to the resin is desirably oxidized to provide greater surface area and "tooth."

*Caul sheets*

The extended scope relative to this factor has been set out above.

*The restraining pliable gasket*

Teflon (trademark) has been mentioned above as one typical material which will withstand the molding temperatures and provide a sufficient amount of pliability to compensate for compression during the shrinkage of the resin. Other heat resistant and pliable materials capable of performing as Teflon (trademark) will generally be included within the scope of invention.

Neoprene synthetic rubber has also been found valuable for this application. Also, Polypenco Fluorescent resin, comprising a special ceramic with fluorocarbon binder, is to be considered within the scope of invention. These materials are characterized by:

(a) Good resistance to deformation under load;
(b) Low modulus of elasticity (formable);
(c) Low thermal expansion; and
(d) Resistance to acids, alkalies, solvents.

*Resin curing*

Relative to the resin system discussed above, no particular limitations are imposed regarding resin curing. It has been found, however, that with one formulation of a flame retarding epoxy resin composition, curing was effected at about 280° F. Broadly, these materials will generally be cured in a range from about 250° to 350° F.

*The cure cycle*

In typical operations, the resin lay-up was positioned on a caul sheet and then placed on a heated press platen. A short dwell was provided to allow the foil and caul to approach press platen temperature. The following are characteristic:

(a) Single clad 1 oz. to 2 oz. per square yard foil: 30 seconds;

(b) Double clad 1 oz. to 2 oz. per square yard foil: 1 minute.

Thereafter, the press was closed and the cure effected. Sufficient pressure to cure the resin free of defects was provided and this will be apparent to the processor. As mentioned above, sufficient pressure is utilized to prevent boil and compress and retain the resin coherent during shrinkage.

*Advantages of the present invention*

Briefly summarized, the advantages of the invention are as follows:

(1) Novel foil coated resin-glass flake laminates which as applied to circuit board applications display low dielectric constants, low power loss factor, resistance to chemical agents, durability and long life and improved flatness with tenacity of the foil to pass the molten solder dip test;

(2) Novel apparatus capable of producing single and double clad laminates; and (3) A process for producing metal foil synthetic resin laminates, characterized by the production of flat and smooth laminates from a heat polymerizable and shrinkable resin and a thermally expandable foil, and a unique "ironing" action for the foil using the heat of exotherm.

It might be stated in explanation that a fully cured resin-flake laminate expands if at all in thickness with application of heat and expands only at the very low coefficient of glass itself in the area dimensions. This is contrasted to a resin-fibrous system wherein the expansion is in area as well as thickness. Thus, since the flake-resin system is a novel working material, the problems inherent were not even suggested by or contained in the prior art as exemplified by a resin-fiber system. Therefore, the principles involved in the present invention as regards the bonding of a thermally expandable foil to a relatively non-expandable or shrinkable resin is believed to provide a substantial step forward in the art.

We claim:

1. In apparatus for producing metal foil clad synthetic resin laminates utilizing a thermally contractible resin and a thermally expandable metal foil,
   - a first plate element having a greater coefficient of thermal expansion than the foil and adapted to receive in supporting relation the laminate in foil-to-plate contact,
   - a second plate element to compress the laminate against said first plate,
   - means within the periphery of said first plate element restraining the resin against flow when compressed between said plates,
   - and means for heating said plates to polymerize said resin whereby said first plate irons out said foil and said resin shrinks during said heating polymerization.

2. In apparatus for producing metal foil-clad synthetic resin laminates utilizing a heat-polymerizable and compression flowable resin admix and a thermally expandable metal foil,
   - means for compressing the flowable resin admix into intimate contact with said foil while restraining the foil in flat condition,
   - means for restraining the resin against transverse flow forces imposed by said compression means,
   - means for heating said compression means to polymerize the resin,
   - and means for tensioning the foil during heating to maintain it in a wrinkle-free condtion over the forces imposed by said restraining means.

3. In apparatus for producing metal foil-clad synthetic resin laminates,
   - a first pressure platen having a flat work surface,
   - an aluminum caul plate carried by said first press platen in thermal contacting relation,
   - a second press platen having a smooth work surface movable into engagement with said first press platen and said caul plate positioned thereon,
   - a heat-resistant pliable gasket carried by said second press platen and bounding at least a portion of said aluminum caul plate,
   - means for moving said press platens toward one another with compressive force,
   - and means for heating said platens.

4. In apparatus for producing metal foil clad synthetic resin laminates,
   - first and second opposed press platens having flat work surfaces,
   - a caul plate carried by one of said platens of a size equal to the work surface thereof and having a coefficient of expansion approximately double that of copper,
   - a heat-resistant pliable gasket carried by said second press platen and bounding at least a portion of said caul plate,
   - means for moving said plates toward one another with compressive force,
   - and means for heating said platens.

5. In apparatus for producing metal foil-clad synthetic resin laminates,
   - first and second opposed press platens having flat working surfaces,
   - a first flat aluminum caul plate carried by one of said platens,
   - a second flat aluminum caul plate positioned between said first caul plate and the other of said platens,
   - and pliable gasket means between said caul plates to surround at least a portion of the working surfaces of the caul plates,
   - and means for heating said press platens.

6. In apparatus for producing metal foil-clad synthetic resin laminates,

- first and second opposed press platens having flat working surfaces,
   - a first flat caul sheet carried by one of said platen work surfaces,
   - a second flat caul sheet positioned between said first caul plate and the other of said press platens,
   - said caul plates having a coefficient of expansion approximately double that of copper,
   - a pliable gasket carried by one of said caul plates to surround at least a portion of the working surfaces of the caul plates,
   - and means for heating said caul plates.

7. In a method of producing metal foil-clad synthetic resin laminates, the steps of
   - admixing epoxy resin and glass flake,
   - applying the admix as a layer to a surface of metal foil having a bonding agent thereon to form a wet laminate,
   - and polymerizing the laminate under heat and pressure greater than contact pressure while tensioning the foil to retain it in a smooth condition.

8. In a method of producing metal foil-clad synthetic resin laminates, the steps of
   - applying a layer of thermally polymerizable and contractible resin to a surface of a metal foil having a resin compatible coupling agent thereon to produce a wet laminate,
   - positioning said laminate on a high expansion caul sheet in foil-to-caul contact,
   - and in a single step applying pressure greater than contact pressure and restraining the resin against flow while tensioning the foil to retain it in a smooth condition.

9. In a method of producing metal foil-clad synthetic resin laminates, the steps of
   - admixing 25 to 75 parts epoxy resin formulation and 25 to 75 parts of milled glass flake to thoroughly wet the flake with the resin,
   - coating one surface of a copper foil with an adhesive formulation comprising:

| Component: | Percent by weight |
|---|---|
| Polyvinyl butyral resin powder containing about 19% polyvinyl alcohol | 0.1–20.0 |
| Phenolic formaldehyde resin | 1–5 |
| Isopropyl alcohol | 60–90 |

- applying a layer of the resin admix to the coated foil surface to produce a wet laminate,
   - positioning said laminate on an aluminum caul plate in foil-to-caul contact,
   - and in a single step compressing the resin into contact with the foil, restraining the resin against lateral flow and heating the laminate and the caul plate to polymerize the resin and cause the caul plate to expand and tension the foil to prevent wrinkling thereof.

10. In a method of producing a metal foil-clad synthetic resin laminate, the steps of
   - applying a resin admix to one surface of a metal foil having a relatively greater coefficient of expansion than said admix,
   - positioning the so-produced lay-up on a metal surface having a greater coefficient of expansion than said foil,
   - and concomitantly compressing the resin into intimate contact with the foil under pressure greater than contact pressure, restraining the resin against flow and thermally polymerizing the resin.

11. The invention of claim 10, further including the step of initiating polymerization of the resin by heating said metal surface and transferring heat therefrom into the resin.

(References on following page)

References Cited

UNITED STATES PATENTS

| | | | |
|---|---|---|---|
| 2,794,104 | 5/1957 | Nathan | 156—583 X |
| 2,954,803 | 10/1960 | Barnes et al. | 156—330 X |
| 3,038,826 | 6/1962 | Medl | 156—330 X |
| 3,165,431 | 1/1965 | Askren | 156—321 X |
| 3,236,176 | 2/1966 | Fischer | 156—583 |
| 3,246,443 | 4/1966 | Slemmons | 156—583 |

EARL M. BERGERT, *Primary Examiner.*

HAROLD ANSHER, *Examiner.*